(12) United States Patent
Chiang et al.

(10) Patent No.: US 10,268,278 B2
(45) Date of Patent: Apr. 23, 2019

(54) MODULAR HAND GESTURE CONTROL SYSTEM

(71) Applicant: H.P.B OPTOELECTRONIC CO., LTD, Taichung (TW)

(72) Inventors: Yuan-Hsin Chiang, Taichung (TW); Hsuan-Yueh Hsu, Taichung (TW)

(73) Assignee: H.P.B. OPTOELECTRONIC CO., LTD, Taichung (TW)

( * ) Notice: Subject to any disclaimer, the term of this patent is extended or adjusted under 35 U.S.C. 154(b) by 14 days.

(21) Appl. No.: 15/590,584

(22) Filed: May 9, 2017

(65) Prior Publication Data

US 2017/0329410 A1 Nov. 16, 2017

(30) Foreign Application Priority Data

May 10, 2016 (TW) .............................. 105114356 A

(51) Int. Cl.
*H04B 1/3827* (2015.01)
*G06F 3/01* (2006.01)
(Continued)

(52) U.S. Cl.
CPC ............ *G06F 3/017* (2013.01); *G06F 3/0304* (2013.01); *G06F 3/167* (2013.01); *H04M 1/6066* (2013.01);
(Continued)

(58) Field of Classification Search
CPC ...... G05B 2219/163; G05B 2219/2642; G05B 2219/25011; G05B 2219/31146; G06F 1/1694; G06F 3/167; G06F 3/017; G06F 3/0304; G06F 3/038; G06K 7/10009; G08C 17/00; G10L 15/22; H04L 12/2803; H04L 12/2807; H04L 12/2818; H04L 12/283; H04L 12/2836; H04L 12/2856;
(Continued)

(56) References Cited

U.S. PATENT DOCUMENTS

| | | | | |
|---|---|---|---|---|
| 9,602,988 | B1* | 3/2017 | Hajdu | H04M 1/7253 |
| 9,975,483 | B1* | 5/2018 | Ramaswamy | G06F 3/013 |
| 2003/0032460 | A1* | 2/2003 | Cannon | H04M 1/6091 |
| | | | | 455/569.2 |
| 2006/0111154 | A1* | 5/2006 | Tran | H04M 1/6083 |
| | | | | 455/569.2 |
| 2008/0261524 | A1* | 10/2008 | Grushkevich | H04M 1/72513 |
| | | | | 455/41.2 |
| 2010/0330909 | A1* | 12/2010 | Maddern | H04M 1/6058 |
| | | | | 455/41.2 |

(Continued)

FOREIGN PATENT DOCUMENTS

| | | |
|---|---|---|
| CN | 203071932 U | 7/2013 |
| CN | 103248743 A | 6/2015 |

*Primary Examiner* — Michael J Eurice
(74) *Attorney, Agent, or Firm* — Muncy, Geissler, Olds & Lowe, P.C.

(57) ABSTRACT

A hand gesture control system to be operated via hand gestures to receive a call from a mobile phone includes: a casing; a control unit installed inside the casing; a hand gesture recognition unit installed inside the casing, including an image capturing module and a hand gesture recognition module, wherein the image capturing module captures an image of a hand gesture of a user and transmits to the gesture recognition module for comparison, which feeds back an operation instruction to the control unit corresponding to the comparison; a wireless transmission unit communicates with the mobile phone via a wireless communication protocol for establishing communication between the mobile phone and the control unit; a microphone disposed at an exterior of the casing in order to receive a user's voice; and a loudspeaker disposed at an exterior of the casing in order to output the user's voice from the microphone.

9 Claims, 3 Drawing Sheets

(51) Int. Cl.
*G06F 3/03* (2006.01)
*G06F 3/16* (2006.01)
*H04R 1/08* (2006.01)
*H04M 1/60* (2006.01)
*G06F 3/038* (2013.01)
*G10L 15/22* (2006.01)
*H04M 1/725* (2006.01)

(52) U.S. Cl.
CPC ............. *H04R 1/086* (2013.01); *G06F 3/038* (2013.01); *G10L 15/22* (2013.01); *H04M 1/72519* (2013.01); *H04M 2250/12* (2013.01); *H04M 2250/52* (2013.01); *H04R 2420/07* (2013.01); *H04R 2420/09* (2013.01)

(58) Field of Classification Search
CPC ...... H04L 29/08099; H04L 2012/2841; H04M 1/6041; H04M 1/605; H04M 1/6066; H04M 1/72519; H04M 11/007; H04M 2250/12; H04M 2250/02; H04M 2250/04; H04M 2250/06; H04M 2250/20; H04M 2250/52; H04M 2250/60; H04M 2250/62; H04M 2250/74; H04R 1/086; H04R 2420/07; H04R 2420/09
See application file for complete search history.

(56) References Cited

U.S. PATENT DOCUMENTS

| | | | | |
|---|---|---|---|---|
| 2011/0103634 | A1* | 5/2011 | Maddern | H04R 1/086 381/359 |
| 2011/0105196 | A1* | 5/2011 | Maddern | H04M 1/05 455/569.1 |
| 2013/0183901 | A1* | 7/2013 | Joergensen | H04M 1/57 455/41.2 |
| 2013/0303192 | A1* | 11/2013 | Louboutin | G06Q 30/0261 455/456.3 |
| 2013/0332156 | A1* | 12/2013 | Tackin | H04M 1/6041 704/226 |
| 2014/0192996 | A1* | 7/2014 | Wilcox | H04M 1/05 381/77 |
| 2014/0342762 | A1* | 11/2014 | Hajdu | H04M 1/72552 455/466 |
| 2014/0376737 | A1* | 12/2014 | Goldman | H04M 1/6066 381/80 |
| 2015/0019266 | A1* | 1/2015 | Stempora | G06Q 40/08 705/4 |
| 2015/0025917 | A1* | 1/2015 | Stempora | G06Q 40/08 705/4 |
| 2015/0229749 | A1* | 8/2015 | Cho | H04M 1/7253 455/566 |

* cited by examiner

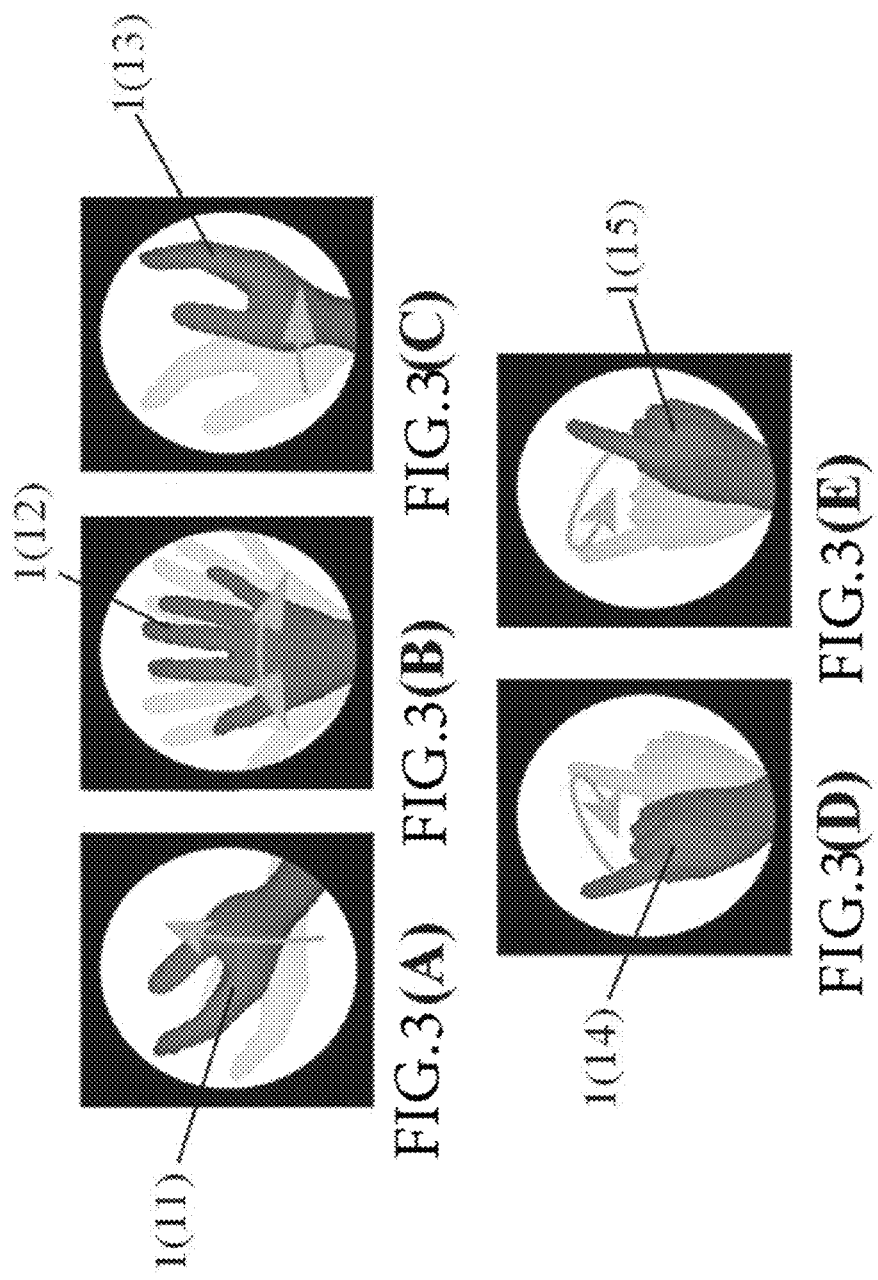

MODULAR HAND GESTURE CONTROL SYSTEM

CROSS-REFERENCE TO RELATED APPLICATION

This application claims the priority of Taiwanese patent application No. 105114356, filed on May 10, 2016, which is incorporated herewith by reference.

BACKGROUND OF THE INVENTION

1. Field of the Invention

The present invention relates to a hand gesture control system, more particularly to a modular hand gesture control system, in which a microphone and a loudspeaker are integrated in such a manner that a user can receive a call from a mobile device via a hand gesture.

2. The Prior Arts

The advance and maturity of mobile communication devices bring a lot of conveniences to our daily lives whether in our working environment or leisure and entertainment. Therefore, smart phones become an indispensable instrument in our daily life, since lots of thing can be accomplished via the smart phones. The more the social activities progress and the more services increase, the more people require going out to meet the public, the more people are trapped in the vehicle because of traffic jam or for various reasons. Hence, the opportunity to use the mobile communication device in the vehicle will increase as much as possible. One drawback a driver encounters is that he has difficulties of talking over the mobile phone while manipulating the steering wheel, which actions may lead to undesired accident. Moreover, people in any place often miss a lot of important messages or business if their hands are in a busy phase (such as baking breads, making pottery) and can not answer a call.

Two Chinese patents namely CN103248743 titling "Hand-free Calling Device and Method thereof" and CN203071932 "Bluetooth Hand Gesture Control Call System" respectively have been proposed, wherein the former ones requires the hand-free calling device coupled electrically with the speed sensing device of the vehicle such that the user cannot installed the device by himself because so doing may damage the initial software and hardware system of the vehicle. In addition, the ARM9 high performance main controller and the photography lens employed therein have largely increased the entire size of the hand-free calling device, which is against the trend of the manufacturers. The latter patent utilizes an infrared ray receiver and a gesture identification sensor, which are separately located and thus is against the trend of the minimization. The stand-alone design of the infrared ray receiver and the gesture identification sensor is not so durable when compared to the modular design. Presently, some vehicles with built-in hand gesture recognition driving system are available in the market and are operable by the driver via the hand gestures. It is noted these vehicles are imported ones and are highly expensive and are beyond the reach of common vehicle users. Therefore, for the manufacturer of the present field, the main task is to provide a modular hardware type hand gesture control system that can be operated easily at any place and time via hand gestures in order to receive and listen to a coming in call from a mobile communication device.

SUMMARY OF THE INVENTION

A primary objective of the present invention is to provide a hand gesture control system, in particular to a modular hand gesture control system in which a microphone and a loudspeaker are integrated such that a user can use a gesture change to communicate with a mobile device at any location In order to achieve the aforesaid the objective, a modular hand gesture control system of the present invention is adapted to be operated via hand gestures in order to receive a call from a mobile communication device and/or to manipulate a network operation, includes: a casing defining a receiving chamber; a control unit installed inside the receiving chamber of the casing; a hand gesture recognition unit installed inside the receiving chamber of the casing, including an image capturing module and a hand gesture recognition module coupled electrically to the image capturing module and the control unit, wherein the image capturing module is adapted to capture an image of a hand gesture of a user and transmits the image to the hand gesture recognition module for comparison, which feeds back an operation instruction to the control unit corresponding to the comparison; a wireless transmission unit installed inside the receiving chamber of the casing and coupled electrically to the control unit, wherein the wireless transmission unit is communicated with the mobile communication device via a wireless communication protocol for establishing communication between the mobile communication device and the control unit; a microphone coupled electrically with the wireless transmission unit, wherein the microphone is disposed at an exterior of the casing in order to receive a user's voice; and a loudspeaker coupled electrically with the wireless transmission unit, wherein the loudspeaker is disposed at an exterior of the casing in order to output the user's voice from the microphone.

The modular hand gesture control system of the present invention further includes a power source management unit to supply electrical power for operation of the hand gesture control system.

In the modular hand gesture control system of the present invention, the power source management unit is selected from a group consisting of a rechargeable battery and an external power source.

Preferably, the external power source is adapted to be connected via a USB connection port.

In the modular hand gesture control system of the present invention, the control unit is selected from a group consisting of a MCU (Microcontroller Unit) and a CPU (Central Processing Unit).

Preferably, the image capturing module is a camera.

In the modular hand gesture control system of the present invention, the hand gesture recognition module has nine sets of built-in hand gesture; each built-in hand gesture set represents and corresponds to an operation instruction.

In the modular hand gesture control system of the present invention, the hand gesture recognition module includes a built-in comparison module stored with a plurality of hand gestures, where the built-in comparison module compares the image of the hand gesture of the user with a respective one of the plurality of hand gestures in the built-in comparison module.

In the modular hand gesture control system of the present invention, the wireless communication protocols is selected from a group consisting of Bluetooth, Infrared (IR), Near Field Communication (NFC), Wireless Local Area Network (WLAN), Wireless Gigabit Alliance (WiGig), ZigBee, Wireless USB, Ultra Wide Band (UWB), Wi-Fi and a combination of at least former two in order to establish a communication between the hand gesture control system and the mobile communication device or the network.

As explained above, in the modular hand gesture control system of the present invention, since the hand gesture recognition module is adapted to capture or sense the image of a hand gesture of a user, the user can at any place receive a call from the mobile communication device. Due to integration of the microphone and the loudspeaker together with the hand gesture recognition module, the high expense and difficulties of installing the prior art conventional built-in hand gesture control system can be avoided. In the modular hand gesture control system of the present invention, regardless of whether the user's hands are busied or not (such as during baking breads or making pottery), a simple hand gesture of the user in front of the hand gesture control system can effectively receive an incoming call, hence eliminating the problem of missing messages. Moreover, since a transmission protocol of 4.2 Bluetooth specification or above is implemented in the hand gesture control system of the present invention, the mobile communication device employed therein has the IoT (Internet of Things) function, thereby enhancing the compatibility of the hand gesture control system of the present invention.

BRIEF DESCRIPTION OF THE DRAWINGS

The present invention will be apparent to those skilled in the art by reading the following detailed description of a preferred embodiment thereof, with reference to the attached drawings, in which:

FIGS. 3(A)-3(E) respectively show different hand gestures of a built-in hand gesture recognition module employed in the modular hand gesture control system of the present invention.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
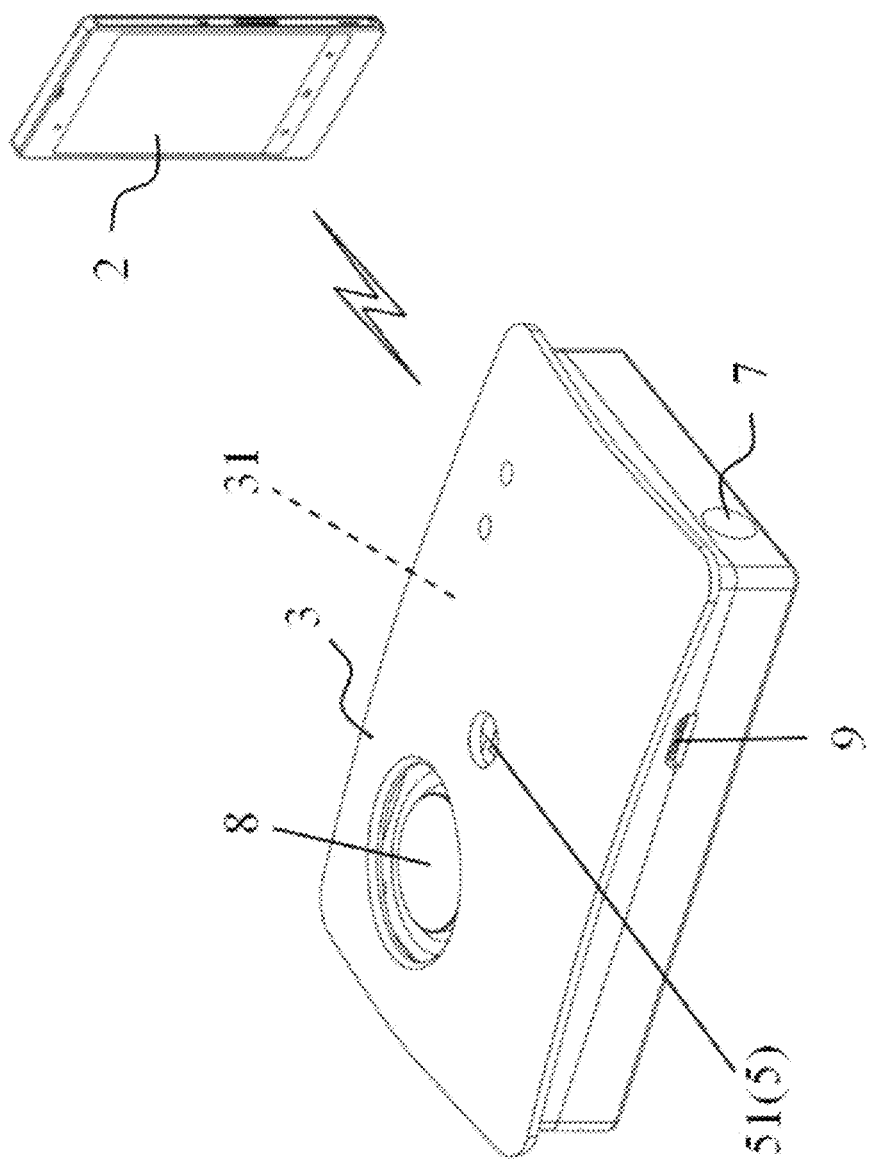
FIG. 1 illustrates a modular hand gesture control system according to the present invention establishing a communication with a mobile communication device.
Figure 2:
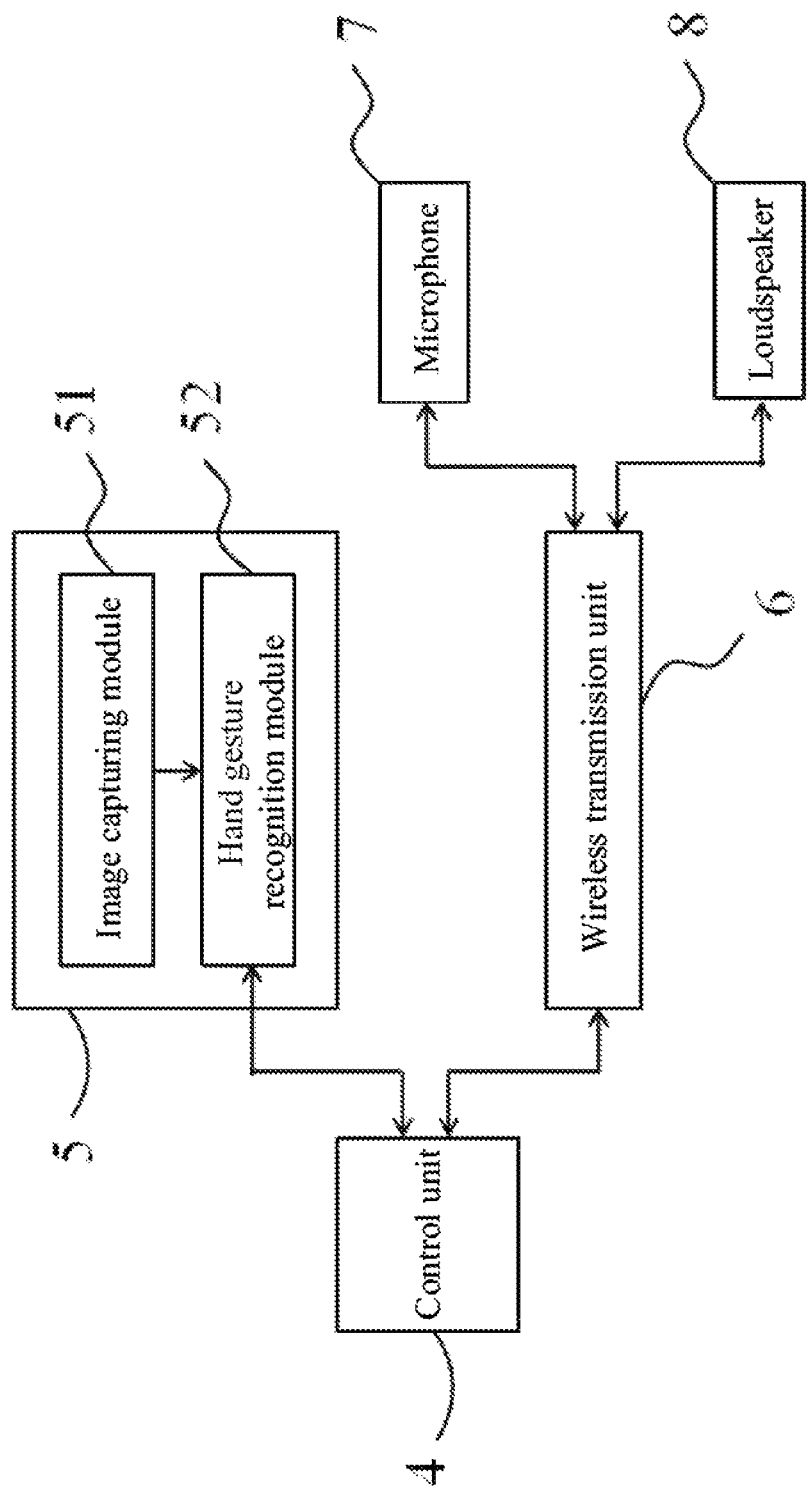
FIG. 2 shows a block diagram illustrating elements constituting the modular hand gesture control system of the present invention.

Referring to FIGS. 1 to 3, wherein FIG. 1 illustrates a modular hand gesture control system according to the present invention establishing a communication with a mobile communication device; FIG. 2 shows a block diagram illustrating elements constituting the modular hand gesture control system of the present invention; and FIGS. 3(A)-3(E) respectively show different hand gestures, which are used to receive a call from a mobile communication device or activates a network operation. The modular hand gesture control system of the present invention includes a casing 3, a control unit 4, a hand gesture recognition unit 5, a wireless transmission unit 6, a microphone 7 and a loudspeaker 8.

The casing 3 defines a receiving chamber 31.

The control unit 4 is installed inside the receiving chamber 31 of the casing 3. Preferably, the control unit 4 is selected from a group consisting of a MCU (Microcontroller Unit) and a CPU (Central Processing Unit). In this embodiment, the microcontroller unit serves as the control unit to execute the hand gesture so as to receive a call from the mobile communication device 2.

The hand gesture recognition unit 5 is installed inside the receiving chamber 31 of the casing 3, includes an image capturing module 51 and a hand gesture recognition module 52 coupled electrically to the image capturing module 51 and the control unit 4, wherein the image capturing module 51 is adapted to capture an image of a hand gesture of a user and transmits the image to the hand gesture recognition module 52 for comparison, which feeds back an operation instruction to the control unit 4 corresponding to the comparison. In this embodiment, the image capturing module 51 is a camera. The hand gesture recognition module 52 has nine sets of built-in hand gesture 1, each built-in hand gesture set 1 represents and corresponds to an operation instruction. The modular hand gesture control system of the present invention utilizes 5 types of hand gestures 1 to communicate with the mobile communication device 2 or activates the network operation. In addition, the hand gesture recognition module 52 further includes a built-in comparison module (not visible) stored with a plurality of hand gestures, the built-in comparison module compares the image of the hand gesture 1 of the user with a respective one of the plurality of hand gestures in the built-in comparison module. In case, the image transmitted from and captured by the image capturing module 51 matches with a respective stored hand gesture, the hand gesture recognition module 52 will transmit one operation instruction in response to the respective stored hand gesture to the control unit 4, such as the hand gesture 1 of FIG. 3(A) is "pick up" corresponding to the operation instruction of the hand gesture 11. It is to note that if the user waves his finger from a lower level toward an upper level within the image capturing range of the image capturing module 51, the comparison module will compare and if the aforementioned gesture matches with the stored gesture 1 in the hand gesture recognition module 52, the control unit 4 will activate to receive a call of the mobile communication device 2, such that the user can listen to the call. In the similar manner, the hand gesture 1 in FIG. 3(B) corresponds to the operation instruction "hang up" of the hand gesture 12, where the user waves his fingers in stretch-out state in left-and-right directions, thereby terminating the conversation. The hand gesture 1 in FIG. 3(C) corresponds to the operation instruction "reject" of the hand gesture 13, where the user waves his hands from a left side toward a right side, thereby rejecting the coming in call. Finally, if the user wishes to adjust the volume of voice during the listening and talking process, the hand gesture 1 in FIGS. 3(D) and 3(E) corresponds to the operation instructions "raise the volume" and "lower the volume", wherein rotation of the index finger in the clockwise direction 14 will increase the volume of voice while rotation of the index finger in the anti-clockwise direction 15 will reduce the volume of voice. Note that the aforementioned hand gestures 1 are used for illustration purposes, and therefore the scope of the present invention should not be limited to the disclosed ones, many other methods so long as they can achieve the same function should be included.

The wireless transmission unit 6 is installed inside the receiving chamber 31 of the casing 3 and is coupled electrically to the control unit 4, wherein the wireless transmission unit 6 is communicated with the mobile communication device 2 via a wireless communication protocol for establishing communication between the mobile communication device 2 and the control unit 4. Preferably, the wireless communication protocols is selected from a group consisting of Bluetooth, Infrared (IR), Near Field Communication (NFC), Wireless Local Area Network (WLAN), Wireless Gigabit Alliance (WiGig), ZigBee, Wireless USB, Ultra Wide Band (UWB), Wi-Fi and a combination of at least former two. Preferably, the modular hand gesture control system of the present invention includes a built-in wireless transmission unit 6 has means to couple with the mobile communication device 2 or the network. In this embodiment, the wireless transmission unit 6 communicates with the mobile communication device 2 via Bluetooth protocol. Preferably, a transmission protocol of 4.2 Bluetooth specification or above is implemented in the hand gesture control system of the present invention, the mobile communication device 2 employed therein has the IoT (Internet of Things) function, thereby enhancing the compatibility of the hand gesture control system of the present invention. Note that the aforementioned communication protocol is used for illustration purpose, and therefore the scope of the present invention should not be limited to the disclosed ones, many other methods so long as they can achieve the same function should be included.

The microphone 7 is coupled electrically with the wireless transmission unit 6, wherein the microphone 7 is disposed at an exterior of the receiving chamber 31 of the casing 3 in order to receive a user's voice, At this time, the microphone 7 is coupled with the transmission unit 6 via a connection wire or wirelessly.

The loudspeaker 8 is coupled electrically with the wireless transmission unit 6, wherein the loudspeaker 8 is disposed at an exterior of the receiving chamber 31 of the casing in order to output the user's voice from the microphone 7. At this time, the loudspeaker 8 is coupled with the transmission unit 6 via a connection wire or wirelessly.

The modular hand gesture control system of the present invention further includes a power source management unit 9 installed within the receiving chamber 31 of the casing 3 to supply electrical power for operation of the hand gesture control system. Preferably, the power source management unit 9 is selected from a group consisting of a rechargeable battery and an external power source. Preferably, the external power source is adapted to be connected via a USB connection port.

The real application of the modular hand gesture control system of the present invention will be explained in the following paragraphs. While a driver is driving through a heavy traffic and if the vehicle is installed with the modular hand gesture control system of the present invention, the driver can receive the call from a mobile communication device 2 via hand gestures, thereby reducing the occurrence of undesired accident. First of all, the control unit 4 with MCU is prepared to execute the hand gesture 1 in order to receive the call from the mobile communication device 2. Later, the hand gesture recognition unit 5 is coupled electrically with the control unit 4, wherein the hand gesture recognition unit 5 includes an image capturing module 51 and a hand gesture recognition module 52 coupled electrically to the image capturing module 51 and the control unit 4, where the image capturing module 51 captures an image of one hand gesture 1 and transmits the same to the hand gesture recognition module 52 for undergoing comparison. After comparison, an operation instruction corresponding to the captured image is fed back to the control unit 4. The hand gesture recognition module 52 has nine sets of hand gesture 1; each represents and corresponds to an operation instruction. In this embodiment, 5 sets of hand gestures 1 are used to communicate with the mobile communication device 2, wherein the hand gesture recognition module 52 includes a comparison module which compares the hand gesture 1 of the image of the user transmitted by the image capturing module 51 with a respective stored hand gesture 1 in the hand gesture recognition module 52. If the two match relative to each other, the hand gesture recognition module 52 will transmit an operation instruction corresponding with the stored hand gesture 1 to the control unit 4. The wireless transmission unit 6 communicating with the mobile communication device 2 via the wireless protocols is further coupled electrically with the control unit 4, the microphone 7 and the loudspeaker 8. Finally, the entire assembly is disposed within the receiving chamber 31 of the casing 3 in such a manner that the microphone 7 and the loudspeaker 8 are exposed to an exterior of the receiving chamber 31 of the casing 3. A power source management unit 9 is disposed within the receiving chamber 31 of the casing 3 for supplying electrical power for operation of the system. The modular hand gesture control system of the present invention can be installed within a vehicle at any appropriate place such that one USB port is used for coupling the power source management unit 9 with the power source of the vehicle. Once the mobile communication device 2 (such as smart phone) of the driver is coupled with the modular hand gesture control system of the present invention via Bluetooth wireless communication protocol, the driver can manipulate the system via his hand gestures to receive the call of the smart phone or to connect with the network operation. Upon hearing the sound of an incoming call of the smart phone, the driver can wave his hand gestures 1 in five different types, where the image capturing module 51 captures the image of hand gestures within the capturing range to provide the communication, like waving his finger from a lower level toward an upper level is "pick up" corresponding to the operation instruction of the hand gesture 11; waving his fingers in stretch-out state in left-and-right directions is "hang up" of the hand gesture 12, thereby terminating the conversation; waving his hands from a left side toward a right side is "reject" of the hand gesture 13; and if the driver wishes to adjust the volume of voice during the listening and talking process, rotation of the index finger in the clockwise direction 14 is "raise the volume" and rotation of the index finger in the anti-clockwise direction 15 is "lower the volume" without touching the smart phone. Of course, the integration of the microphone 7, the loudspeaker 8 and the Bluetooth wireless communication protocol assists the receiving or rejection of the incoming call or the network operation functions. In other words, a relatively large amount of installation expense can be saved when utilizing the modular hand gesture control system of the present invention due to lower cost of maintaining.

The modular hand gesture control system of the present invention provides the following advantages:

1. Since the hand gesture recognition unit captures, senses or identifies a hand gesture of the user, the user of the smart phone can receive the incoming call of the smart phone regardless of his location with respect to the smart phone. Integration of the microphone and the loudspeaker in the modular design, the system can be implemented at any places, hence the installation expense thereof can be reduced tremendously.

2. Integration of the microphone and the loudspeaker in the modular design, the hand gesture control system of the present invention needs not be built-in together with the driving system of the vehicle. In other words, the high expense of installation can be avoided since the driver can install the hand gesture control system by him within a suitable place in the vehicle, thereby enhancing the communication of smart phone during the driving operation of the vehicle.

3. In the event that the user of the smart phone is too busy, whose hands are not free to pick up the smart phone (liking baking bread or making pottery), with the assistance of the hand gesture control system of the present invention, the user needs to make a hand gesture in a specific type only so that he can receive the call of the smart phone without touching the same.

4. Since a transmission protocol of 4.2 Bluetooth specification or above is implemented in the hand gesture control system of the present invention, the mobile communication device employed therein has the IoT (Internet of Things) function, thereby enhancing the compatibility of the hand gesture control system of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A modular hand gesture control system adapted to be operated via hand gestures in order to receive a call from a mobile communication device and/or to activate a network operation, comprising:
    a casing defining a receiving chamber;
    a control unit installed inside said receiving chamber of said casing;
    a hand gesture recognition unit installed inside said receiving chamber of said casing, including an image capturing module and a hand gesture recognition module coupled electrically to said image capturing module and said control unit, wherein said image capturing module is adapted to capture an image of a hand gesture of a user and transmits said image to said hand gesture recognition module for comparison, which feeds back an operation instruction to said control unit corresponding to said comparison;
    a wireless transmission unit installed inside said receiving chamber of said casing and coupled electrically to said control unit, wherein said wireless transmission unit is configured to communicate with the mobile communication device by using a wireless communication protocol to establish communication between the mobile communication device and the control unit;
    a microphone coupled electrically with said wireless transmission unit, wherein said microphone is disposed at an exterior of said casing in order to receive a user's voice; and
    a loudspeaker coupled electrically with said wireless transmission unit, wherein said loudspeaker is disposed at an exterior of said casing in order to output said user's voice received from said microphone.

2. The modular hand gesture control system according to claim 1, wherein said control unit is selected from a group consisting of a MCU (Microcontroller Unit) and a CPU (Central Processing Unit).

3. The modular hand gesture control system according to claim 1, wherein said image capturing module is a camera.

4. The modular hand gesture control system according to claim 1, wherein said wireless communication protocol is selected from a group consisting of Bluetooth, Infrared (IR), Near Field Communication (NFC), Wireless Local Area Network (WLAN), Wireless Gigabit Alliance (WiGig), Zig-Bee, Wireless USB, Ultra Wide Band (UWB), Wi-Fi and a combination of at least two thereof.

5. The modular hand gesture control system according to claim 1, further comprising a power source management unit to supply electrical power for operation of the hand gesture control system.

6. The modular hand gesture control system according to claim 5, wherein said power source management unit is selected from a group consisting of a rechargeable battery and an external power source.

7. The modular hand gesture control system according to claim 6, wherein said external power source is adapted to be connected via a USB connection port.

8. The modular hand gesture control system according to claim 1, wherein said hand gesture recognition module has nine sets of built-in hand gesture, each built-in hand gesture set represents and corresponds to an operation instruction.

9. The modular hand gesture control system according to claim 8, wherein said hand gesture recognition module includes a built-in comparison module stored with nine sets of hand gestures, said built-in comparison module compares said image of said hand gesture of said user with a respective one of said plurality of hand gestures in said built-in comparison module.

\* \* \* \* \*